United States Patent Office 3,681,323
Patented Aug. 1, 1972

3,681,323
6,9-OXYGEN BRIDGED ERYTHROMYCIN DERIVATIVES
Paul Kurath, Waukegan, Richard Stephen Egan, Mundelein, and Peter Hadley Jones, Lake Forest, Ill., assignors to Abbott Laboratories, North Chicago, Ill.
No Drawing. Filed Sept. 24, 1970, Ser. No. 75,249
Int. Cl. C07c 47/18
U.S. Cl. 260—210 E    4 Claims

ABSTRACT OF THE DISCLOSURE 8,9-anhydroerythromycin B 6,9-hemiketal and 9-dihydroerythromycin A and B 6,9-epoxides are useful as antimicrobial agents.

DETAILED DESCRIPTION OF THE INVENTION

This invention relates to erythromycin derivatives and especially those derivatives having an oxygen bridge between the 6- and 9-positions of the formula set forth below. In particular, this invention relates to compounds wherein $R_1$ is hydrogen or hydroxyl and when $R_1$ is hydrogen, $R_2$ and $R_3$ either are hydrogen or are joined together thus contributing to the formation of a double bond between the 8- and 9-positions of the erythronolide moiety; and when $R_1$ is hydroxyl, $R_2$ and $R_3$ are hydrogen, which have antimicrobial activity against *Staphylococcus aureus*.

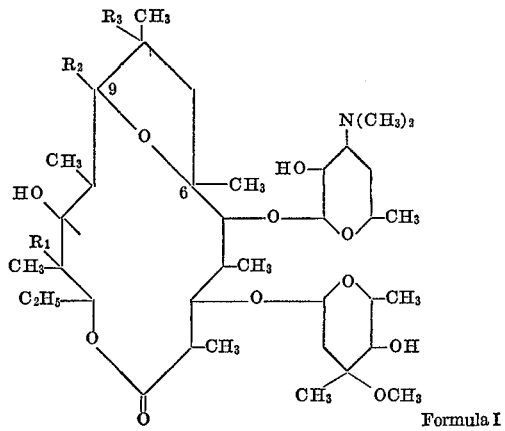

Formula I

In the instance where $R_1$ is hydrogen and the 8,9-position is unsaturated, i.e., $R_2$ and $R_3$ are joined together forming a double bond therebetween, then the compound resulting is 8,9-anhydroerythromycin B 6,9-hemiketal, which is more conveniently referred to as erythromycin B enol ether.

The compound 8,9-anhydroerythromycin A 6,9-hemiketal is not reported as such in the literature. Stephens and Conine in Antibiotics Annual 1958–1959: 349 do report a "hemiketal" which from the reported preparative method appears to be 8,9-anhydroerythromycin A 6,9-hemiketal, hereinafter referred to as erythromycin A enol ether.

The novel erythromycin B enol ether has exceptional properties that significantly distinguish it from erythromycin A enol ether.

Chemically the difference between these two enol ethers is that erythromycin A enol ether has a hydroxyl present in the 12-position of the erythrolonide ring, while erythromycin B enol ether has a hydrogen in place of the hydroxyl in that position of the ring. This superficially small difference has consequences that provide the novel erytromycin B enol ether with exceptional properties that serve to significantly distinguish it from erythromycin A enol ether.

It has been found that when erythromycin A enol ether is exposed to an aqueous acid environment such as would be found in the gastrointestinal tracts of animals, it forms the compound anhydroerythromycin A which compared to either erythromycin A or B has diminished in vivo antibiotic activity. On the other hand, erythromycin B enol ether, when similarly exposed to aqueous acid reverts to erythromycin B. This important difference can more readily be seen by reference to the mouse protection studies which appear later.

The erythromycin B enol ether is prepared by dissolution or suspension of erythromycin B is an anhydrous acid, of which glacial acetic acid is preferred. The admixture of erythromycin B and anhydrous acid is stirred for from 1 to 4 hours at a temperature of 20–30° C. Excess acid is then removed for example by distillation at reduced pressure. Such removal should be performed at a temperature of not more than 60° C. so as not to destroy product, and preferably is accomplished at a temperature of less than 40° C. The erythromycin B enol ether is then extracted from the residue with a suitable inert solvent, preferably chloroform.

It has further been found that the enol ethers of erythromycin A and B can both be reduced to the 9-dihydroerythromycin-6,9-epoxide by the action of a hydrogenating agent, preferably hydrogen, in the presence of a suitable catalyst, which catalyst includes the platinum group metals, preferably platinum.

The following examples will further illustrate the preparation of the compounds of this invention.

EXAMPLE 1

Erythromycin B enol ether

Erythromycin B (25 g., 0.035 mole) was dissolved in 200 ml. of glacial acetic acid. After stirring at 25° C. for 2 hours, the excess acetic acid was removed at reduced pressure while maintaining the reaction mixture over 35° C. water bath during this operation. The residual oil was poured into cold aqueous solution containing 5% by weight sodium bicarbonate and the resulting mixture extracted three times with chloroform. The combined chloroform extracts were washed once with an aqueous solution containing 5% by weight sodium carbonate, once with water and then dried over sodium sulfate. The solvent was then removed to yield 23 g. of a colorless glass. The glass after dissolving in 100 ml. of ether, immediately deposited crystals which when filtered yielded 14 g. of erythromycin B enol ether, M.P. 80–82°. The product was recrystallized from acetone to yield 12 g. (50%) of erythromycin B anol ether, M.P. 80–82°, a maximum 209mμ (7120) $[\alpha]_D^{25}$—33° (1.14 in methanol).

*Analysis.*—Calculated for $C_{37}H_{65}NO_{11}$ (percent): C, 63.31; H, 9.62; N, 2.00; O, 25.07. Found (percent): C, 63.11; H, 9.60; N, 1.90; O, 25.06.

EXAMPLE 2

9-dihydroerythromycin B 6,9-epoxide

The erythromycin B enol ether was prepared by allowing 1.87 g. of erythromycin B to remain in 50 ml. of glacial acetic acid for 2½ hours. The catalyst was prepared by reducing 1.87 g. of $PtO_2$ in 50 ml. of glacial acetic acid. The solution of the erythromycin B enol ether was added to the acetic acid suspension of the catalyst together with 50 ml. of glacial acetic acid and 10 drops of trifluoroacetic acid was added to bring the solution to 150 ml. Hydrogenation by bubbling hydrogen gas through the mixture was then started. The initial hydrogen uptake was rapid and the hydrogenation was essentially completed after 22 hours. The reaction mixture was filtered, the catalyst was washed with a total volume of 100 ml. of acetic acid and the combined solutions were evaporated under reduced pressure to a small volume. The residue was dissolved in chloroform. The chloroform solution was then extracted with two 150-ml. portions of aqueous solutions saturated with sodium bicarbonate and then with two 150-ml. portions of water. The organic solutions were dried over magnesium sulfate, filtered and evaporated to leave 1.48 g. of residue. No crystals could be obtained. The reaction mixture was purified in a thin layer chromatographic system on silica gel with benzene-methanol (9:1) as the solvent system in an atmosphere saturated with ammonium hydroxide. The 9-dihydroerythromycin B 6,9-epoxide had an $R_f$ value of 0.40. When the zone of the thin layer chromotagram corresponding to 9-dihydroerythromycin B 6,9-epoxide was brought in contact with an agar plate culture of *Bacillus subtilis* it was observed that growth of the organism was inhibited. The compound is also active against *Staphylococcus aureus*.

EXAMPLE 3

9-dihydroerythromycin A 6,9-epoxide

In the same manner as the previous example, erythromycin A enol ether is prepared by having 1.85 grams of erythromycin A remain in 50 ml. of glacial acetic acid for about 3 hours. The catalyst is prepared in the same manner as the previous example, and the catalyst suspension, together with the solution of erythromycin A enol ether is combined with an additional 50 ml. of glacial acetic acid together with 10 drops of trifluoroacetic acid. This admixture is then hydrogenated as before. The reaction mixture is filtered, washed with about 100 ml. of glacial acetic acid, and the combined solutions are evaporated under reduced pressure to a small volume. The residue is dissolved in chloroform. The chloroform solution is then extracted and isolated by chromatography as in the previous example.

The mouse protection studies referred to previously were conducted as follows:

Mice (CF-1, females) were injected intraperitoneally with 0.75 ml. of 3% hog gastric mucin of a $10^{-6}$ dilution of a 24 hour brain heart infusion suspension of *Staphylococcus aureus* (Smith). The infectious dose per mouse was 10–100 $LD_{50}$. The mice were treated by the oral route, one hour post infection and again 5 hours post infection. The animals were observed for 7 days. The data were analyzed by the Bliss method of probit analysis.

The percent mortality for ten control mice at each of the dilutions $10^{-6}$; $10^{-7}$; $10^{-8}$ and $10^{-9}$ of the suspension, was found to be 100%, 40%, 50% and 0% respectively.

The results are recorded in Table I where M/K refers to micrograms/kilogram of body weight.

TABLE I
The effect of erythromycin derivatives on a *Staphylococcus Aureus* (Smith) infection in mice

| Compound | Total drug administered vs Mouse mortality (percent) | | | | | $CD_{50}$ | Limits of confidence | |
|---|---|---|---|---|---|---|---|---|
| | | | | | | | Lower | Upper |
| Erythromycin A | 300 M/K (3.3) | 150 M/K (3.3) | 100 M/K (26.6) | 80 M/K (23.3) | 40 M/K (73.3) | 56.88 | 46.12 | 70.16 |
| Erythromycin B | 300 M/K (0.0) | 150 M/K (0.0) | 100 M/K (3.3) | 80 M/K (50.0) | 40 M/K (90.0) | 68.17 | 31.07 | 94.45 |
| Erythromycin A enol ether | 400 M/K (3.3) | 200 M/K (20.0) | 100 M/K (76.6) | 50 M/K (90.0) | 25 M/K (100) | 131.00 | 110.10 | 155.88 |
| Anhydroerythromycin A | 400 M/K (23.3) | 200 M/K (60.0) | 100 M/K (86.6) | 50 M/K (90.0) | 25 M/K (100) | 247.03 | (¹) | (¹) |
| Erythromycin B enol ether | 400 M/K (10.0) | 200 M/K (13.3) | 100 M/K (36.6) | 50 M/K (80.0) | 25 M/K (83.3) | 81.71 | 64.02 | 104.30 |

¹ Insufficient slope to arrive at a confidence limit.

As can readily be seen, the erythromycin B enol ether at concentrations of 200 M/K and below is a superior antibiotic to erythromycin A enol ether. This is unexpected because erythromycin A and its derivatives have heretofore been found more effective (i.e., greater activity) than erythromycin B and its derivatives. At high levels of administration, e.g., 400 M/K, the difference is not so prounounced because a small amount of erythromycin A is formed when erythromycin A enol ether is administered, as well as the main reversion product anhydroerythromycin A.

The novel compounds of this invention can be administered intravenously, intermuscularly or orally to warm blooded animals. These compounds can be employed with known pharmaceutical carriers to prepare pills, tablets, solutions or suspensions and the like. The new compounds of this invention can be administered alone or in admixture with other pharmaceutically active drugs. The usual dose is in the range of 200–500 micrograms/kg. of body weight, although the optimum dosage must be determined in each individual instance.

We claim:

1. A compound of the formula

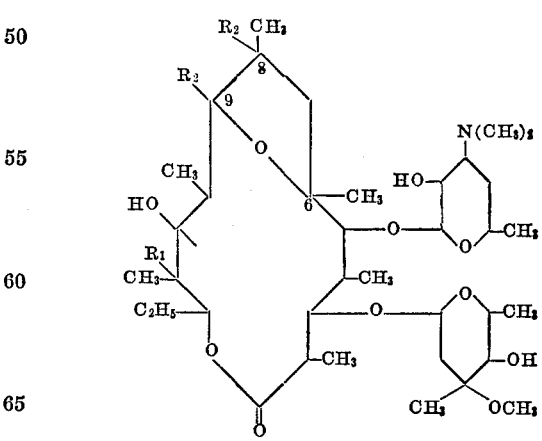

wherein $R_1$ is hydrogen and hydroxy; and when $R_1$ is hydrogen $R_2$ and $R_3$ are each hydrogen or are joined together to form a bond between the 8- and 9-positions; and when $R_1$ is hydroxyl, $R_2$ and $R_3$ are each hydrogen.

2. A compound according to claim 1 in which $R_1$ is hydrogen and $R_2$ and $R_3$ are joined to form a double bond, namely, 8,9-anhydroerythromycin B 6,9-hemiketal.

3. A compound according to claim 1 in which $R_1$ is hydroxyl and $R_2$ and $R_3$ are hydrogen, namely, 9-dihydroerythromycin A 6,9-epoxide.

4. A compound according to claim 1 in which $R_1$, $R_2$ and $R_3$ are hydrogen, namely, 9-dihydroerythromycin B 6,9-epoxide.

References Cited

UNITED STATES PATENTS

| | | | |
|---|---|---|---|
| 2,862,921 | 12/1958 | Booth et al. | 260—210 E |
| 3,417,077 | 12/1968 | Murphy et al. | 260—210 E |

LEWIS GOTTS, Primary Examiner

J. R. BROWN, Assistant Examiner

U.S. Cl. X.R.

260—999

UNITED STATES PATENT OFFICE
CERTIFICATE OF CORRECTION

Patent No. 3,681,323                    Dated August 1, 1972

Inventor(s) P. Kurath, R. Egan, P. Jones

It is certified that error appears in the above-identified patent and that said Letters Patent are hereby corrected as shown below:

Claim 1, please delete the following:

and substitute therefor:

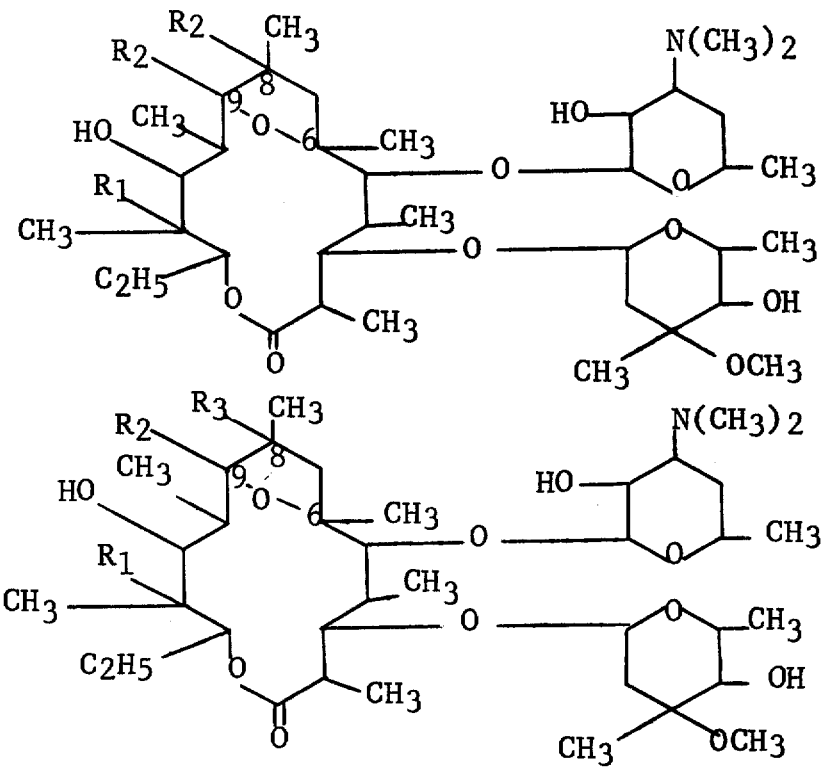

Signed and sealed this 24th day of April 1973.

(SEAL)
Attest:

EDWARD M. FLETCHER, JR.                 ROBERT GOTTSCHALK
Attesting Officer                       Commissioner of Patents